United States Patent
Kramer et al.

(10) Patent No.: US 9,790,315 B2
(45) Date of Patent: Oct. 17, 2017

(54) POLYMER CONTAINING SILANE GROUPS

(71) Applicant: SIKA TECHNOLOGY AG, Baar (CH)

(72) Inventors: Andreas Kramer, Zürich (CH); Urs Burckhardt, Zürich (CH); Ursula Stadelmann, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/901,492

(22) PCT Filed: Jul. 24, 2014

(86) PCT No.: PCT/EP2014/065983
§ 371 (c)(1),
(2) Date: Dec. 28, 2015

(87) PCT Pub. No.: WO2015/014725
PCT Pub. Date: Feb. 5, 2015

(65) Prior Publication Data
US 2016/0369036 A1    Dec. 22, 2016

(30) Foreign Application Priority Data

Jul. 30, 2013 (EP) .................... 13178562

(51) Int. Cl.
| | | |
|---|---|---|
| *C08G 77/08* | (2006.01) |
| *C08G 18/28* | (2006.01) |
| *C08G 18/48* | (2006.01) |
| *C08G 18/75* | (2006.01) |
| *C08G 18/76* | (2006.01) |
| *C08G 18/80* | (2006.01) |
| *C08G 18/10* | (2006.01) |
| *C08G 18/12* | (2006.01) |
| *C08G 18/22* | (2006.01) |
| *C08G 18/42* | (2006.01) |
| *C09J 175/04* | (2006.01) |
| *C08G 18/77* | (2006.01) |
| *C09J 175/08* | (2006.01) |
| *C08G 65/336* | (2006.01) |
| *C08G 77/18* | (2006.01) |
| *C08G 77/26* | (2006.01) |

(52) U.S. Cl.
CPC ........... *C08G 18/289* (2013.01); *C08G 18/10* (2013.01); *C08G 18/12* (2013.01); *C08G 18/227* (2013.01); *C08G 18/4202* (2013.01); *C08G 18/4825* (2013.01); *C08G 18/4866* (2013.01); *C08G 18/755* (2013.01); *C08G 18/7621* (2013.01); *C08G 18/7671* (2013.01); *C08G 18/778* (2013.01); *C08G 18/809* (2013.01); *C09J 175/04* (2013.01); *C09J 175/08* (2013.01); *C08G 65/336* (2013.01); *C08G 77/18* (2013.01); *C08G 77/26* (2013.01); *C08G 2170/20* (2013.01)

(58) Field of Classification Search
CPC .... C08G 18/289; C08G 65/336; C08G 77/18; C08G 77/26
See application file for complete search history.

(56) References Cited

U.S. PATENT DOCUMENTS

| | | |
|---|---|---|
| 4,104,296 A | 8/1978 | Pike |
| 5,587,502 A | 12/1996 | Moren et al. |
| 2009/0018302 A1 | 1/2009 | Laas et al. |
| 2010/0143712 A1 | 6/2010 | Plantenberg et al. |
| 2011/0034627 A1* | 2/2011 | Boudet .................. C08G 18/10 524/588 |

FOREIGN PATENT DOCUMENTS

| | | |
|---|---|---|
| DE | 10 2007 038 661 A1 | 2/2009 |
| DE | 102008020979 A1 | 10/2009 |
| EP | 2014692 A2 | 1/2009 |
| SU | 555104 A1 | 4/1977 |
| WO | 2013/174891 A2 | 11/2013 |

OTHER PUBLICATIONS

Feb. 2, 2016 International Preliminary Report on Patentability issued in International Patent Application No. PCT/EP2014/065983.
Dec. 16, 2014 Search Report issued in International Patent Application No. PCT/EP2014/065983.
Naoki et al., "Preparation of Oligosaccharide-Modified Silica Gel as Resolving Agent for Chromatography," Chemical Abstracts Service, 1994, XP-002718613.
Sep. 8, 2014 International Search Report issued in International Patent Application No. PCT/EP2014/065984.
Feb. 2, 2016 International Preliminary Report on Patentability issued in International Patent Application No. PCT/EP2014/065984.
Apr. 17, 2017 Office Action issued in U.S. Appl. No. 14/903,796.

* cited by examiner

*Primary Examiner* — Margaret Moore
(74) *Attorney, Agent, or Firm* — Oliff PLC

(57) ABSTRACT

The invention relates to polymers containing silane groups, to a method for their production and to their use as a component of curable compositions, in particular of moisture-curing sealants, adhesives or coatings that can be applied at ambient temperature, or of hot-melt adhesives containing silane groups. The polymers containing silane groups are obtained in particular by means of a special hydroxysilane which can be produced in particular from the reaction of lactides with aminosilanes.

16 Claims, No Drawings

POLYMER CONTAINING SILANE GROUPS

TECHNICAL FIELD

The invention relates to polymers containing silane groups and to the use thereof as a constituent of moisture-curing compositions which are usable particularly for bonding, sealing and coating of construction products and industrial products.

STATE OF THE ART

Polymers containing silane groups, also referred to as "silane-functional polymers" or "silane-modified polymers" (SMP) or "silane-terminated polymers" (STP), have been used successfully for some time as a binder system in moisture-curing compositions which find use especially as elastic adhesives, sealants and coatings in the construction and manufacturing industries. An easily executable route to polymers containing silane groups which proceeds from widely available raw materials and is thus commercially attractive leads via the reaction of aminosilanes with polyurethane polymers containing isocyanate groups, the silane groups ultimately being bonded to the polymer via urea groups. However, the polymers containing silane groups thus obtainable either have high viscosities, which makes it more difficult to formulate compositions having good processibility, or have limited thermal stability after curing.

Properties of interest in relation to viscosity and thermal stability are possessed by polymers containing silane groups wherein the silane groups are bonded to the polymer via urethane groups rather than urea groups. Such polymers containing silane groups are known as reaction products of polyols with isocyanatosilanes. However, this route is only of limited interest since isocyanatosilanes are costly, have low storability and are highly toxic.

A more attractive alternative would be the reaction of polyurethane polymers containing isocyanate groups with hydroxysilanes. However, the prior art discloses only few hydroxysilanes. The handling thereof is complicated by their tendency to self-condense because of a rapid reaction of the hydroxyl group with the silane group, and they are therefore frequently very impure and/or have low storage stability.

U.S. Pat. No. 5,587,502 discloses hydroxycarbamoylsilanes. However, the hydroxy-silanes described have too low a purity to be of real interest for preparation of silane-functional polymers, and the hydroxyl group thereof is not very reactive.

SUMMARY OF THE INVENTION

It is therefore an object of the present invention to provide a polymer containing silane groups which has a low viscosity, crosslinks rapidly with moisture and is suitable as a binder in moisture-curing compositions which cure to give an elastic non-tacky material.

It has been found that, surprisingly, this object is achieved by a polymer as claimed in claim 1. It has a low viscosity and excellent storage stability and cures surprisingly rapidly with moisture to give an elastic material having good strength and extensibility. The polymer is preparable in high purity in a simple process from raw materials of good commercial availability.

Further aspects of the invention are the subject matter of further independent claims. Particularly preferred embodiments of the invention are the subject matter of the dependent claims.

WAYS OF EXECUTING THE INVENTION

The invention provides a polymer having end groups of the formula (I)

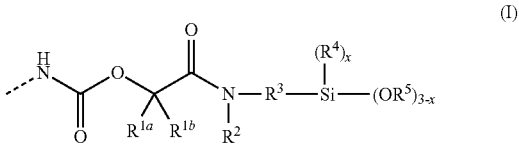

where
$R^{1a}$ and $R^{1b}$ are each independently a hydrogen atom or a monovalent hydrocarbyl radical having 1 to 12 carbon atoms, or together are an alkylene radical having 2 to 6 carbon atoms;
$R^2$ is a hydrogen atom or a monovalent hydrocarbyl radical which has 1 to 12 carbon atoms and optionally contains ether groups, ester groups, nitrile groups, amino groups or silane groups;
$R^3$ is a linear or branched alkylene or cycloalkylene radical having 1 to 20 carbon atoms, optionally having aromatic moieties, and optionally having one or more heteroatoms, especially nitrogen atoms;
$R^4$ is an alkyl radical having 1 to 8 carbon atoms;
$R^5$ is an alkyl radical which has 1 to 10 carbon atoms and optionally contains ether groups; and
x is 0, 1 or 2.

In the present document, the term "alkoxysilane group", or "silane group" for short, refers to a silyl group bonded to an organic radical and having one to three, especially two to three, hydrolyzable alkoxy radicals on the silicon atom. Correspondingly, the term "alkoxysilane", or "silane" for short, refers to an organic compound having at least one silane group. "Hydroxysilane", "isocyanatosilane", "aminosilane" and "mercaptosilane" refer respectively to silanes having, on the organic radical, in addition to the silane group, one or more hydroxyl, isocyanato, amino and mercapto groups.

Substance names beginning with "poly", such as polyol or polyisocyanate, refer to substances containing, in a formal sense, two or more of the functional groups that occur in their name per molecule.

The term "polyurethane polymer" refers to all polymers which are prepared by what is called the diisocyanate polyaddition process. The term "polyurethane polymer" also encompasses polyurethane polymers having isocyanate groups, as obtainable from the reaction of polyols with an excess of polyisocyanates, these being polyisocyanates themselves and also often being called prepolymers.

"Molecular weight" in the present document refers to the molar mass (in grams per mole) of a molecule. "Average molecular weight" refers to the number-average $M_n$ of an oligomeric or polymeric mixture of molecules, which is typically determined by means of gel permeation chromatography (GPC) against polystyrene as standard.

A dotted line in the formulae in this document in each case represents the bond between a substituent and the corresponding remainder of the molecule.

A substance or composition is referred to as "storage-stable" when it can be kept at room temperature in a suitable container over a prolonged period, typically over several weeks up to 6 months or more, without any change in its application or use properties resulting from the storage to a degree of relevance for its use.

"Room temperature" refers to a temperature of about 23° C.

Polymers having end groups of the formula (I) in which $R^{1a}$ and $R^{1b}$ are different substituents are chiral compounds which may be present in isomerically pure form or as isomer mixtures.

The end groups of the formula (I) are silane groups. Silane groups have the property of being hydrolyzed on contact with moisture. This forms silanol groups (Si—OH groups) and, through subsequent condensation reactions, siloxane groups (Si—O—Si groups).

Preferably, neither $R^{1a}$ nor $R^{1b}$ is a tertiary alkyl radical such as tert-butyl, for example. A tertiary alkyl radical causes severe steric hindrance, which can be disadvantageous for the preparation and thermal stability of the polymer. $R^{1a}$ is preferably a hydrogen atom or a monovalent hydrocarbyl radical which has 1 to 6 carbon atoms and is not attached via a tertiary carbon atom, especially hydrogen, methyl, ethyl, n-propyl, isopropyl, butyl, sec-butyl, cyclopentyl, cyclohexyl or phenyl. Such a polymer has very good preparability.

$R^{1a}$ is more preferably a hydrogen atom or a monovalent hydrocarbyl radical which has 1 to 6 carbon atoms and is bonded via a primary carbon atom, especially hydrogen, methyl, ethyl, n-propyl, butyl or sec-butyl. Such a polymer has particularly good preparability and good mechanical properties.

$R^{1a}$ is especially a hydrogen atom or a methyl radical, most preferably a methyl radical.

An $R^{1a}$ substituent in the form of methyl has the advantage that such a polymer has particularly good obtainability and particularly good mechanical properties.

An $R^{1a}$ substituent in the form of hydrogen has the advantage that such a polymer has particularly good preparability.

$R^{1b}$ is more preferably a hydrogen atom or a methyl radical, especially a hydrogen atom.

More preferably $R^{1a}$ and $R^{1b}$ are each independently a hydrogen atom or a methyl radical. Such a polymer is easily obtainable and has good preparability and good mechanical properties.

Most preferably, $R^{1a}$ is a methyl radical and $R^{1b}$ is a hydrogen atom. Such a polymer has particularly good obtainability, particularly good preparability and particularly good mechanical properties.

$R^2$ is preferably a hydrogen atom or an alkyl radical or a cycloalkyl radical or an alkoxysilylalkyl radical. Such a polymer is particularly easily obtainable.

$R^2$ is more preferably a hydrogen atom. Such a polymer is particularly easily preparable.

$R^3$ is preferably a linear or branched alkylene radical having 1 to 6 carbon atoms.

More preferably, the $R^3$ radical is selected from the group consisting of 1,3-propylene, 2-methyl-1,3-propylene, 1,4-butylene, 3-methyl-1,4-butylene and 3,3-dimethyl-1,4-butylene. Among these, particular preference is given to 1,3-propylene and 3,3-dimethyl-1,4-butylene, especially to 1,3-propylene.

Such a polymer has particularly good obtainability.

The position of the substituents in the $R^3$ radicals is numbered proceeding from the silicon atom.

$R^4$ is preferably a methyl radical.

$R^5$ is preferably a methyl radical or ethyl radical, most preferably an ethyl radical.

A polymer having methoxysilane groups has the advantage that it crosslinks particularly rapidly with moisture.

A polymer having ethoxysilane groups has the advantage that it is particularly storage-stable and that on hydrolysis it releases ethanol, which is comparatively non-toxic.

x is preferably 0 or 1, especially 0. Such a polymer has particularly reactive silane groups.

Most preferably, $R^{1a}$ is methyl, $R^{1b}$ is hydrogen, $R^2$ is hydrogen, $R^5$ is ethyl and x is 0. Such a polymer has very good thermal stability after curing.

Preferably, the polymer having end groups of the formula (I) has a functionality based on the end groups of the formula (I) in the range from 1 to 4, more preferably 1 to 3, especially 2 or 3, most preferably 2. Such a polymer enables good mechanical properties, especially high extensibility.

Preferably, the polymer having end groups of the formula (I) has an average molecular weight in the range from 1,000 to 30,000 g/mol, preferably 2,000 to 25,000 g/mol, more preferably 3,000 to 20,000 g/mol, and especially from 4,000 to 15,000 g/mol. Such a polymer enables good mechanical properties.

A preferred polymer having end groups of the formula (I) is liquid at room temperature and has a majority of polyoxyalkylene units, especially polyoxypropylene units. A majority of its end groups of the formula (I) are bonded to cycloaliphatic or aromatic radicals, especially to cycloaliphatic radicals derived from isophorone diisocyanate. Such a polymer has a low viscosity and enables good elastic properties. It is especially suitable as a constituent of room temperature applicable elastic coatings and elastic sealants and/or adhesives. Having end groups of the formula (I) bonded to cycloaliphatic radicals, it is additionally particularly storage-stable. Such a polymer is preferably free of isocyanate groups.

A further preferred polymer having end groups of the formula (I) has a majority of polyester and/or polycarbonate units, especially polyester units, and is solid at room temperature. A majority of its end groups of the formula (I) are bonded to cycloaliphatic or aromatic radicals, preferably to aromatic radicals, especially derived from diphenylmethane 4,4'-, 2,4'- and/or 2,2'-diisocyanate and any desired mixtures of these isomers (MDI). Such a polymer is particularly suitable as a constituent of hot-applicable adhesives, called hotmelt adhesives. Such a polymer may, as well as end groups of the formula (I), also contain isocyanate groups.

The invention further provides a process for producing a polymer having end groups of the formula (I) by reacting
at least one polyol,
at least one diisocyanate,
either at least one lactide of the formula (II) or at least one hydroxy ester of the formula (III), and
at least one aminosilane of the formula (IV).

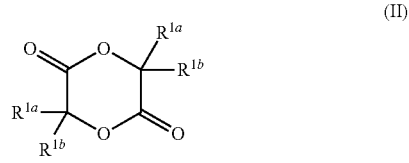

(II)

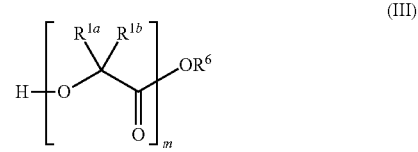

(III)

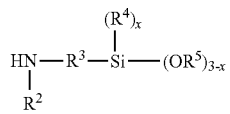

(IV)

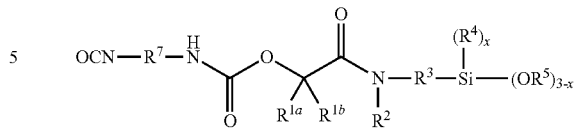

(VII)

In the formulae (II), (III) and (IV), m is an integer from 1 to 100;

$R^6$ is a monovalent hydrocarbyl radical having 1 to 12 carbon atoms; and $R^{1a}$, $R^{1b}$, $R^2$, $R^3$, $R^4$, $R^5$ and x are each as already defined.

The process can be conducted in various embodiments, wherein compounds a), b), c) and d) are reacted in a different sequence and in several steps to give the polymer having end groups of the formula (I).

In one embodiment, also called process V1 hereinafter, in a first step, a polyol and a diisocyanate are converted to a polyurethane polymer having isocyanate groups. In a second step, either a lactide of the formula (II) or a hydroxy ester of the formula (III) is reacted with an aminosilane of the formula (IV) to give a hydroxysilane of the formula (V). In a third step, the polyurethane polymer having isocyanate groups and the hydroxysilane of the formula (V) are converted to the polymer having end groups of the formula (I).

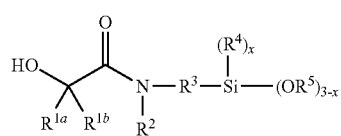

(V)

In the formula (V), $R^{1a}$, $R^{1b}$, $R^2$, $R^3$, $R^4$, $R^5$ and x are each as already defined.

In a further embodiment, also called process V2 hereinafter, in a first step, a polyol and a diisocyanate are converted to a polyurethane polymer having isocyanate groups. The latter is reacted in a second step with a hydroxy ester of the formula (III) with m=1 to give a polymer having ester groups of the formula (VI), which is reacted in a third step with the aminosilane of the formula (IV) to give the polymer having end groups of the formula (I).

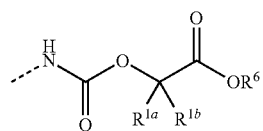

(VI)

In the formula (VI), $R^{1a}$, $R^{1b}$ and $R^6$ are each as already defined.

In a further embodiment, also called process V3 hereinafter, in a first step, either a lactide of the formula (II) or a hydroxy ester of the formula (III) is reacted with an aminosilane of the formula (IV) to give a hydroxysilane of the formula (V). The hydroxysilane of the formula (V) is reacted in a second step with a diisocyanate to give an isocyanatosilane of the formula (VII), which is reacted in a third step with a polyol to give the polymer having end groups of the formula (I).

In the formula (VII), $R^7$ is a divalent hydrocarbyl radical having 4 to 16 carbon atoms and $R^{1a}$, $R^{1b}$, $R^2$, $R^3$, $R^4$, $R^5$ and x are each as already defined.

Preferably, $R^7$ is 1,6-hexylene, 2,2,4- and/or 2,4,4-trimethyl-1,6-hexylene, 1,3-and/or 1,4-cyclohexylene, 1,3- and/or 1,4-xylylene, 1,3- and/or 1,4-tetramethylxylylene, 4,4'- and/or 2,4'-substituted diphenylmethane, 2,4- and/or 2,6-substituted toluene or IPDI after removal of the two isocyanate groups, especially IPDI after removal of the two isocyanate groups. These isocyanatosilanes are storage-stable substances of good obtainability. Particularly preferred isocyanatosilanes of the formula (VII) are selected from the group consisting of 1-oxo-1-((3-(triethoxysilyl)propyl)amino)-2-propyl ((5-isocyanato-1,3,3-trimethylcyclohexyl)methyl)carbamate; 1-oxo-1-((3-(triethoxysilyl)propyl)amino)-2-propyl 3,5,5-trimethyl-3-(isocyanatomethyl)-cyclohexylcarbamate; 1-oxo-1-((3-(triethoxysilyl)propyl)amino)-2-propyl 4-methyl-3-isocyanatophenylcarbamate; 1-oxo-1-((3-(triethoxysilyl)propyl)amino)-2-propyl 2-methyl-3-isocyanatophenylcarbamate; and corresponding compounds having trimethoxysilyl groups or having dimethoxymethylsilyl groups.

Among these, particular preference is given to the compounds having ethoxysilane groups. They are particularly storage-stable and toxicologically advantageous.

Among these, further particular preference is given to the cycloaliphatic compounds. They are particularly storage-stable.

Said embodiments of the process are elucidated in detail hereinafter.

In process V1, in the first step, a polyol is reacted with a diisocyanate to give a polyurethane polymer having isocyanate groups.

This reaction is preferably conducted with exclusion of moisture at a temperature of 50° C. to 160° C., optionally in the presence of suitable catalysts, with metered addition of the diisocyanate in such a way that the isocyanate groups thereof are present in a stoichiometric excess in relation to the hydroxyl groups in the polyol. More particularly, the excess of polyisocyanate is chosen so as to leave, in the resulting polyurethane polymer, after the conversion of all the hydroxyl groups, a content of free isocyanate groups of 0.1% to 5% by weight, preferably 0.2% to 4% by weight, more preferably 0.3% to 3% by weight, based on the overall polymer. The polyurethane polymer can optionally be prepared with additional use of plasticizers, in which case the plasticizers used do not contain any groups reactive toward isocyanates.

In process V1, in the second step, either a lactide of the formula (II) or a hydroxy ester of the formula (III) is reacted with an aminosilane of the formula (IV) to give a hydroxysilane of the formula (V).

In the case of a lactide of the formula (II), this reaction is preferably conducted with exclusion of moisture at a temperature in the range from 15 to 120° C., especially 20 to 90° C., optionally in the presence of a catalyst and/or a desiccant such as, more particularly, vinyltriethoxysilane, tetraethoxysilane, vinyltrimethoxysilane or a molecular sieve. Preferably about two moles of aminosilane are used per mole of lactide. More particularly, an aminosilane/lactide ratio in the range from 1.8 to 2.2 is employed. The conversion can be effected without solvent or in a suitable solvent. After the reaction, any volatile compounds present, especially solvents, unreacted reactants or alcohol released, can be removed from the reaction product by distillation.

In the case of a hydroxy ester of the formula (III), this reaction is preferably conducted with exclusion of moisture at a temperature in the range from 40 to 150° C., optionally in the presence of a desiccant such as, more particularly, vinyltriethoxysilane, tetraethoxysilane, vinyltrimethoxysilane or a molecular sieve. Preference is given to using a catalyst, especially a metal compound, especially a titanate, a stannate or an aluminate. Preferably about one mole of aminosilane of the formula (IV) per ester group of the hydroxy ester is used. A hydroxy ester of the formula (III) in which m is 1 is thus preferably used in about a molar ratio of 1:1 with the aminosilane. A polymeric hydroxy ester in which, for example, m is 10 is accordingly preferably used in about a molar ratio of 1:10 with the aminosilane. Preference is given to working with an aminosilane/hydroxy ester ratio in the range from (0.8 to 1.2)m. The conversion can be effected without solvent or in a suitable solvent. Preferably, after the reaction, the alcohol released is removed from the reaction product by distillation together with any further volatile compounds present, especially solvents or unreacted reactants.

The hydroxysilane of the formula (I) may contain conversion products from the hydrolysis and/or condensation of the silane groups, including one from an intra- or intermolecular self-condensation with the hydroxyl group. Preferred hydroxysilanes of the formula (V) contain only small amounts of such conversion products.

In the process V1, in the third step, the polyurethane polymer having isocyanate groups is reacted with the hydroxysilane of the formula (V) to give the polymer having end groups of the formula (I).

This reaction is preferably conducted with exclusion of moisture at a temperature in the range from 20 to 160° C. Optionally, a catalyst is used, especially a tertiary amine or a metal compound, especially a bismuth(III), zinc(II), zirconium(IV) or tin(II) compound or an organotin(IV) compound. The hydroxysilane of the formula (V) is preferably used in a superstoichiometric or stoichiometric ratio relative to the isocyanate groups, such that a polymer which has end groups of the formula (I) and is free of isocyanate groups is obtained. More particularly, an OH/NCO ratio in the range from 1 to 1.25 is employed. The reaction is advantageously monitored by measuring the isocyanate content of the polymer obtained, for example by means of IR spectroscopy.

If the hydroxysilane of the formula (V) has been used in a substoichiometric amount, the polymer obtained additionally contains isocyanate groups as well as the end groups of the formula (I). Such a polymer is preferably prepared by using an OH/NCO ratio in the range from 0.1 to 0.9, more preferably 0.2 to 0.8, especially 0.3 to 0.7. The polymer obtained has a distinctly reduced content of monomeric diisocyanate compared to the polyurethane polymer having isocyanate groups used, which is advantageous for toxicological reasons.

In process V2, in the first step, a polyol and a diisocyanate are converted to a polyurethane polymer having isocyanate groups, in the same way as in the first step of process V1.

In process V2, in the second step, the polyurethane polymer having isocyanate groups is reacted with a hydroxy ester of the formula (III) with m=1 to give a polymer having ester groups of the formula (VI). This reaction is preferably conducted with exclusion of moisture at a temperature in the range from 20 to 160° C., optionally in the presence of a catalyst, especially a bismuth(III), zinc(II), zirconium(IV) or tin(II) compound or an organotin(IV) compound. The hydroxy ester and the polyurethane polymer having isocyanate groups are preferably used in roughly stoichiometric amounts based on the hydroxyl and isocyanate groups, especially in an OH/NCO ratio in the range from 1 to 1.2. In process V2, in the third step, the polymer having ester groups of the formula (VI) is reacted with an aminosilane of the formula (IV) to give the polymer having end groups of the formula (I). This reaction is preferably conducted with exclusion of moisture at a temperature in the range from 40 to 160° C. Preference is given to using a catalyst, especially a metal compound, especially a titanate, a stannate or an aluminate. The aminosilane of the formula (IV) is preferably used in a stoichiometric or slightly superstoichiometric amount based on the ester groups of the formula (VI). Preferably, after the reaction, the alcohol released is removed from the reaction product by distillation together with any further volatile compounds present, especially solvents or unconverted reactants.

In process V3, in the first step, either a lactide of the formula (II) or a hydroxy ester of the formula (III) is reacted with an aminosilane of the formula (IV) to give a hydroxysilane of the formula (V), in the same way as in the second step of process V1.

In process V3, in the second step, the hydroxysilane of the formula (V) is reacted with a diisocyanate to give an isocyanatosilane of the formula (VII). This reaction is preferably conducted with exclusion of moisture at a temperature in the range from 20 to 120° C. Optionally, a catalyst is used, especially a tertiary amine or a metal compound, especially a bismuth(III), zinc(II), zirconium(IV) or tin(II) compound or an organotin(IV) compound. Preference is given here to using about one mole of hydroxysilane per mole of diisocyanate. More particularly, an NCO/OH ratio in the range from 1.8 to 2.2 is employed.

In process V3, in the third step, the isocyanatosilane of the formula (VII) is reacted with a polyol to give the polymer having end groups of the formula (I). This reaction is preferably conducted with exclusion of moisture at a temperature in the range from 50 to 160° C. Optionally, a catalyst is used, especially a tertiary amine or a metal compound, especially a bismuth(III), zinc(II), zirconium (IV) or tin(II) compound or an organotin(IV) compound. Preferably, an NCO/OH ratio in the range from 1.8 to 2.2 is employed.

Preferably, the process for preparing the polymer having end groups of the formula (I) is conducted via a hydroxysilane of the formula (V) as intermediate, i.e. according to process V1 or V3. This preparation is performable in a particularly simple manner and enables a polymer having end groups of the formula (I) having particularly good mechanical properties.

Preferably, the hydroxysilane here is selected from the group consisting of N-(3-triethoxysilylpropyl)-2-hydroxyacetamide, N-(3-trimethoxysilylpropyl)-2-hydroxyacetamide, N-(3-diethoxymethylsilylpropyl)-2-hydroxyacetamide, N-(3-dimethoxymethylsilylpropyl)-2-hydroxyacetamide, N-(3-triethoxysilylpropyl)-2-hydroxypropanamide, N-(3-trimethoxysilylpropyl)-2-hydroxypropanamide, N-(3-diethoxymethylsilylpropyl)-2-hydroxypropanamide, N-(3-dimethoxymethylsilylpropyl)-2-hydroxypropanamide, N-(3-triethoxysilylpropyl)-2- hydroxy-2-methylpropanamide, N-(3-trimethoxysilylpropyl)-2-hydroxy-2-methylpropanamide, N-(3-diethoxymethylsilylpropyl)-2-hydroxy-2-methylpropanamide and N-(3-dimethoxymethylsilylpropyl)-2-hydroxy-2-methylpropanamide. These hydroxysilanes are easily obtainable and the hydroxyl group thereof is of very high reactivity.

Among these, preference is given to the trialkoxysilanes, especially the triethoxysilanes.

Particular preference is given to N-(3-trimethoxysilylpropyl)-2-hydroxypropanamide and N-(3-triethoxysilylpropyl)-2-hydroxypropanamide.

Most preferred is N-(3-triethoxysilylpropyl)-2-hydroxypropanamide. It is particularly storage-stable and ethanol is released on hydrolysis thereof, which is advantageous for toxicological reasons. In addition, it enables polymers having end groups of the formula (I) having particularly good thermal stability after curing.

Preferably, for the preparation of a hydroxysilane of the formula (V), a lactide of the formula (II) is used. From this preparation, under particularly mild conditions, a hydroxysilane of high purity is obtainable, which enables a polymer having end groups of the formula (II) having very particularly good mechanical properties.

Most preferred is a process for preparing a polymer having end groups of the formula (I), in which a lactide of the formula (II) is reacted with an aminosilane of the formula (IV) to give a hydroxysilane of the formula (V), which is subsequently reacted with a polyurethane polymer having isocyanate groups from the reaction of a polyol with a diisocyanate.

In the process for preparing a polymer having end groups of the formula (I), at least one polyol is used. Suitable polyols are especially the following commercial polyols or any desired mixtures thereof:

polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, possibly polymerized with the aid of a starter molecule having two or more active hydrogen atoms, for example water, ammonia or compounds having a plurality of OH or NH groups, for example ethane-1,2-diol, propane-1,2- and 1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3- and -1,4-dimethanol, bisphenol A, hydrogenated bisphenol A, 1,1,1-trimethylolethane, 1,1,1-trimethylolpropane, glycerol, aniline, and mixtures of the aforementioned compounds. Preference is given to polyoxyalkylene polyols having a low degree of unsaturation (measured to ASTM D-2849-69 and reported in milliequivalents of unsaturation per gram of polyol (meq/g)), prepared, for example, with the aid of double metal cyanide complex catalysts (DMC catalysts).

Particularly suitable are polyoxyalkylenediols or polyoxyalkylenetriols, especially polyoxyethylene- and polyoxypropylenedi- and -triols. Additionally particularly suitable are what are called ethylene oxide-terminated (EO-endcapped) polyoxypropylenepolyols. The latter are polyoxyethylene-polyoxypropylene copolyols which are obtained, for example, by further alkoxylating polyoxypropylenepolyols with ethylene oxide on completion of the polypropoxylation reaction and thus have primary hydroxyl groups.

Styrene-acrylonitrile- or acrylonitrile-methyl methacrylate-grafted polyether polyols.

Polyester polyols, also called oligoesterols, prepared by known processes, especially the polycondensation of hydroxycarboxylic acids or the polycondensation of aliphatic and/or aromatic polycarboxylic acids with di- or polyhydric alcohols.

Especially suitable polyester polyols are those prepared from di- to trihydric, especially dihydric, alcohols, for example ethylene glycol, diethylene glycol, propylene glycol, dipropylene glycol, neopentyl glycol, butane-1,4-diol, pentane-1,5-diol, 3-methylhexane-1,5-diol, hexane-1,6-diol, octane-1,8-diol, decane-1,10-diol, dodecane-1,12-diol, 1,12-hydroxystearyl alcohol, cyclohexane-1,4-dimethanol, dimer fatty acid diol (dimer diol), neopentyl glycol hydroxypivalate, glycerol, 1,1,1-trimethylolpropane or mixtures of the aforementioned alcohols, with organic di- or tricarboxylic acids, especially dicarboxylic acids, or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride, or mixtures of the aforementioned acids, and also polyester polyols formed from lactones, for example from ε-caprolactone, and starters such as the aforementioned di- or trihydric alcohols.

Particularly suitable polyester polyols are polyester diols.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate- and polymethacrylatepolyols.

Polyhydroxy-functional fats and oils, for example natural fats and oils, especially castor oil; or what are called oleochemical polyols, obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can be derivatized, for example, by hydroformylation and hydrogenation to give hydroxy fatty acid esters.

Polyhydrocarbonpolyols, also called oligohydrocarbonols, for example polyhydroxy-functional polyolefins, polyisobutylenes, polyisoprenes; polyhydroxy-functional ethylene-propylene, ethylene-butylene or ethylene-propylene-diene copolymers, as produced, for example, by Kraton Polymers; polyhydroxy-functional polymers of dienes, especially of 1,3-butadiene, which may also be prepared from anionic polymerization in particular; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers, as producible, for example, from epoxides or amino alcohols and carboxyl-terminated acrylonitrile/butadiene copolymers (commercially available, for example, under the Hypro® (formerly Hycar®) CTBN and CTBNX and ETBN name from Nanoresins AG, Germany, or Emerald Performance Materials LLC); and hydrogenated polyhydroxy-functional polymers or copolymers of dienes.

Preferred polyols are polyoxyalkylenepolyols, polyesterpolyols, polycarbonatepolyols and polyacrylatepolyols.

Particular preference is given firstly to room temperature liquid polyoxypropylenepolyols and polyoxyethylene-polyoxypropylene copolyols, especially polyoxypropylenediols having a mean molecular weight in the range from 1,000 to 20,000 g/mol, preferably from 2,000 to 20,000 g/mol. Particular preference is further given to room temperature solid, amorphous or semicrystalline or crystalline polyols, especially polyesterpolyols and polycarbonatepolyols, especially polyesterdiols having a mean molecular weight in the range from 1,500 to 15,000 g/mol, preferably 1,500 to 8000 g/mol, especially 2,000 to 5,500 g/mol. Particularly suitable are crystalline or semicrystalline adipic acid/hexanediol polyesters and dodecanedicarboxylic acid/hexanediol polyesters.

In the process for preparing a polymer having end groups of the formula (I), at least one diisocyanate is used. Suitable diisocyanates are especially commercially available aliphatic, cycloaliphatic, arylaliphatic and aromatic, preferably cycloaliphatic and aromatic, diisocyanates.

Preferred diisocyanates are hexamethylene 1,6-diisocyanate (HDI), 2,2,4- and 2,4,4-trimethylhexamethylene 1,6-diisocyanate (TMDI), cyclohexane 1,3- and 1,4-diisocyanate and any desired mixtures of these isomers, 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI), m- and p-xylylene diisocyanate (m- and p-XDI), m- and p-tetramethylxylylene 1,3- and 1,4-diisocyanate (m- and p-TMXDI), tolylene 2,4- and 2,6-diisocyanate (TDI) and any desired mixtures of these isomers, diphenylmethane 4,4'-, 2,4'- and 2,2'-diisocyanate and any desired mixtures of these isomers (MDI).

More preferably, the diisocyanate is selected from the group consisting of HDI, IPDI, MDI and TDI. These diisocyanates are particularly readily obtainable. For the reaction with room temperature solid polyols, MDI is the most preferred. With this, in particular, hotmelt adhesives having particularly advantageous properties are obtainable.

For the reaction with room temperature liquid polyols or with a hydroxysilane of the formula (V), IPDI and TDI are the most preferred. This affords reaction products having relatively low viscosity. Most preferred is IPDI. With this, particularly lightfast polymers are obtainable.

In the process for preparing a polymer having end groups of the formula (I), it is possible to use at least one lactide of the formula (II).

Suitable lactides of the formula (II) are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6-diphenyl-1,4-dioxane-2,5-dione (lactide formed from mandelic acid). These lactides are particularly readily obtainable.

Preference is given to 1,4-dioxane-2,5-dione and 3,6-dimethyl-1,4-dioxane-2,5-dione. From these lactides, hydroxysilanes having very good storage stability and a very reactive hydroxyl group are obtainable.

Particular preference is given to 3,6-dimethyl-1,4-dioxane-2,5-dione. From this lactide, hydroxysilanes having particularly good storage stability and a very reactive hydroxyl group are obtainable. Especially the lactide formed from L-lactic acid, also called L-lactide or (3S,6S)-3,6-dimethyl-1,4-dioxane-2,5-dione, is particularly readily obtainable, and is a renewable raw material.

In the process for preparing a polymer having end groups of the formula (I) it is possible to use at least one hydroxy ester of the formula (III).

Suitable hydroxy esters of the formula (III) are especially the methyl esters, ethyl esters, isopropyl esters, n-propyl esters, tert-butyl esters, n-butyl esters and sec-butyl esters of 2-hydroxyacetic acid, 2-hydroxypropionic acid (lactic acid), 2-hydroxybutyric acid, 2-hydroxy-2-methylpropionic acid (2-hydroxyisobutyric acid), 2-hydroxypentanoic acid, 2-hydroxy-3-methylbutyric acid, 2-hydroxyhexanoic acid, 2-hydroxy-4-m ethylpentanoic acid, 2-hydroxy-2-cyclohexylacetic acid (hexahydromandelic acid), 2-hydroxy-2-phenylacetic acid (mandelic acid), 2-hydroxy-2-cyclopentylacetic acid and 2-hydroxy-2-cyclohexylacetic acid, and oligomeric forms of these hydroxy esters, i.e. compounds of the formula (III) with m>1.

Preference is given to the methyl esters and ethyl esters of 2-hydroxyacetic acid, lactic acid, 2-hydroxyisobutyric acid and oligomeric forms of these hydroxy esters. Preference is given here to the methyl esters for the reaction with aminosilanes having methoxy groups and to the ethyl esters for reaction with aminosilanes having ethoxy groups.

Particular preference is given to methyl lactate and ethyl lactate and oligomeric forms thereof, especially methyl L-lactate and ethyl L-lactate. The L-lactic esters are renewable raw materials. Most preferred is ethyl L-lactate.

In the process for preparing a polymer having end groups of the formula (I), at least one aminosilane of the formula (IV) is additionally used.

Suitable aminosilanes of the formula (IV) are especially aminosilanes having a primary amino group, especially 3-aminopropyltriethoxysilane, 3-aminopropyl-trimethoxysilane, 3-aminopropyldiethoxymethylsilane, 3-aminopropyldimeth-oxymethylsilane, 4-aminobutyltriethoxysilane, 4-aminobutyltrimethoxysilane, 4-aminobutyldiethoxymethylsilane, 4-aminobutyldimethoxymethylsilane, 4-amino-3-methylbutyltriethoxysilane, 4-amino-3-methylbutyltrimethoxysilane, 4-amino-3-methylbutyldiethoxymethylsilane, 4-amino-3-methylbutyldimethoxymethyl-silane, 4-amino-3,3-dimethylbutyltriethoxysilane, 4-amino-3,3-dimethylbutyltrimethoxysilane, 4-amino-3,3-dimethylbutyldiethoxymethylsilane, 4-amino-3,3-dimethylbutyldimethoxymethylsilane, aminomethyltriethoxysilane, amino-methyltrimethoxysilane, aminomethyldiethoxymethylsilane and aminomethyldimethoxymethylsilane.

Among these, preference is given to 3-aminopropyltriethoxysilane, 3-amino-propyltrimethoxysilane, 3-aminopropyldiethoxymethylsilane, 3-aminopropyl-dimethoxymethylsilane, 4-amino-3,3-dimethylbutyltriethoxysilane, 4-amino-3,3-dimethylbutyltrimethoxysilane, 4-amino-3,3-dimethylbutyldiethoxymethylsilane and 4-amino-3,3-dimethylbutyldimethoxymethylsilane.

Particular preference is given to 3-aminopropyltriethoxysilane and 3-aminopropyltrimethoxysilane, especially 3-aminopropyltriethoxysilane.

Further suitable aminosilanes of the formula (IV) are aminosilanes having a secondary amino group, especially bis(trimethoxysilylpropyl)amine, bis(triethoxysilylpropyl)amine, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-ethyl-3-amino-2-methyl-propyltrimethoxysilane, N-ethyl-3-amino-2-methylpropyltriethoxysilane, diethyl N-(3-trimethoxysilylpropyl)aminosuccinate, diethyl N-(3-triethoxysilylpropyl)-aminosuccinate, N-cyclohexylaminomethyltriethoxysilane and N-cyclohexyl-aminomethyltrimethoxysilane.

In the preparation of the polymer having end groups of the formula (I), in addition to the polyol, it is possible to use further alcohols as well, especially low molecular weight mono- or polyhydric alcohols or polymeric monools. Alcohols of this kind can be used as well as an addition to the polyol during the preparation process described, or they can be added after the process has been performed, for example in order to react with isocyanate groups present. It may be especially advantageous to admix a polymer which has end groups of the formula (I) and additionally contains isocyanate groups with ethanol, for example, in order to convert the isocyanate groups. Subsequently, excess ethanol can be removed by distillation.

The polymer having end groups of the formula (I) has good storage stability with exclusion of moisture. On contact with moisture, the end groups of the formula (I) are hydrolyzed. This forms silanol groups (Si—OH groups), and subsequent condensation reactions form siloxane groups (Si—O—Si groups). Any further moisture-reactive groups present, especially isocyanate groups, likewise react with moisture present. As a result of these reactions, the polymer cures to give a crosslinked plastic. The water for the curing can either come from the air (air humidity), or the polymer can be contacted with a water-containing component, for example by spreading, spraying or mixing-in. During the curing, silanol groups can condense, for example, with hydroxyl groups in a substrate to which the polymer has been applied, as a result of which an additional improvement in the adhesion on the substrate is possible in the course of crosslinking.

The polymer having end groups of the formula (I) has advantageous properties. It has a low viscosity, which is advantageous for the further processing thereof as a curable composition. It is very storage-stable and cures surprisingly rapidly with moisture, combined with a long open time, to give a crosslinked material having good adhesion properties. A room temperature liquid polymer having end groups of the formula (I) cures with moisture at room temperature to give an elastic non-tacky material having high strength, high extensibility and very good thermal stability. At high temperatures such as 90° C. or 100° C., the cured polymer remains elastic even after prolonged exposure, whereas many polymers containing silane groups from the prior art lose any strength or even deliquesce after only a few days. A room temperature solid polymer having end groups of the formula (I), in the uncrosslinked state, has good thermal stability, meaning that it can be left for a while in the heated molten state without occurrence of any significant increase in viscosity or gelation. It crosslinks with moisture to give a material of high bond strength, which cannot be melted again when reheated.

The polymer having end groups of the formula (I) is particularly suitable for use as a constituent of a curable composition comprising at least one further constituent.

Preferably, the curable composition is either a moisture-curing composition applicable at room temperature or a hotmelt adhesive containing silane groups.

A room temperature applicable moisture-curing composition comprises a room temperature liquid polymer having end groups of the formula (I) and at least one further constituent. Such a composition may especially be used as an elastic adhesive and/or elastic sealant or elastic coating.

Preferably, such a moisture-curing composition has a content of polymer having end groups of the formula (I) of 5% to 90% by weight, especially 10% to 60% by weight. Suitable further constituents are especially catalysts, crosslinkers, plasticizers, fillers, pigments, solvents, adhesion promoters, desiccants, rheology aids and stabilizers.

Preferably, such a moisture-curing composition comprises at least one catalyst which accelerates the crosslinking of polymers containing silane groups. Especially suitable for the purpose are metal catalysts and/or nitrogen compounds.

Suitable metal catalysts are compounds of titanium, zirconium, aluminum and tin, especially organotin compounds, organotitanates, organozirconates and organoaluminates, where these metal catalysts especially have alkoxy groups, aminoalkoxy groups, sulfonate groups, carboxyl groups, 1,3-diketonate groups, 1,3-ketoesterate groups, dialkylphosphate groups and dialkylpyrophosphate groups.

Particularly suitable organotin compounds are dialkyltin oxides, dialkyltin dichlorides, dialkyltin dicarboxylates and dialkyltin diketonates, especially dibutyltin oxide, dibutyltin dichloride, dibutyltin diacetate, dibutyltin dilaurate, dibutyltin diacetylacetonate, dioctyltin oxide, dioctyltin dichloride, dioctyltin diacetate, dioctyltin dilaurate and dioctyltin diacetylacetonate, and also alkyltin thioesters.

Particularly suitable organotitanates are as follows:
titanium(IV) complexes having two 1,3-diketonate ligands, especially 2,4-pentanedionate (=acetylacetonate), and two alkoxide ligands;
titanium(IV) complexes having two 1,3-ketoesterate ligands, especially ethylacetoacetate, and two alkoxide ligands;
titanium(IV) complexes having one or more aminoalkoxide ligands, especially triethanolamine or 2-((2-aminoethyl)amino)ethanol, and one or more alkoxide ligands;
titanium(IV) complexes having four alkoxide ligands;
and more highly condensed organotitanates, especially oligomeric titanium(IV) tetrabutoxide, also referred to as polybutyl titanate;
where suitable alkoxide ligands are especially isobutoxy, n-butoxy, isopropoxy, ethoxy and 2-ethylhexoxy.

Very particularly suitable organotitanates are bis(ethylacetoacetato)-diisobutoxytitanium(IV), bis(ethylacetoacetato)diisopropoxytitanium(IV), bis(acetylacetonato)diisopropoxytitanium(IV), bis(acetylacetonato)diisobutoxytitanium(IV), tris(oxyethyl)amineisopropoxytitanium(IV), bis[tris(oxyethyl)-amine]diisopropoxytitanium(IV), bis(2-ethylhexane-1,3-dioxy)titanium(IV), tris[2-((2-aminoethyl)amino)ethoxy]ethoxytitanium(IV), bis(neopentyl(diallyl)oxy-diethoxytitanium(IV), titanium(IV) tetrabutoxide, tetra (2-ethylhexyloxy)titanate, tetra(isopropoxy)titanate and polybutyl titanate.

Especially suitable are the following commercially available products: Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals).

Particularly suitable organozirconates are the following commercially available products: Ken-React® NZ® 38J, KZ® TPPJ, KZ® TPP, NZ® 01, 09, 12 38, 44 or 97 (all from Kenrich Petrochemicals) and Snapcure® 3020, 3030, 1020 (all from Johnson Matthey & Brandenberger).

A particularly suitable organoaluminate is the commercially available product K-Kat 5218 (from King Industries).

Nitrogen compounds suitable as catalyst are especially amines such as, in particular, N-ethyldiisopropylamine, N,N,N',N'-tetramethylalkylenediamines, polyoxyalkyleneamines, 1,4-diazabicyclo[2.2.2]octane; aminosilanes such as, in particular, 3-aminopropyltrimethoxysilane, 3-aminopropyldimethoxymethyl-silane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)-propyl]ethylenediamine and the analogs thereof having ethoxy or isopropoxy in place of the methoxy groups on the silicon; amidines such as, in particular, 1,8-diazabicyclo[5.4.0]undec-7-ene (DBU), 1,5-diazabicyclo[4.3.0]non-5-ene (DBN), 6-dibutylamino-1,8-diazabicyclo[5.4.0]undec-7-ene; guanidines such as, in particular, tetramethylguanidine, 2-guanidinobenzimidazole, acetylacetoneguanidine, 1,3-di-o-tolylguanidine, 2-tert-butyl-1,1,3,3-tetramethylguanidine; and imidazoles such as, in particular, N-(3-trimethoxy-silylpropyl)-4,5-dihydroimidazole and N-(3-triethoxysilylpropyl)-4,5-dihydroimidazole.

Also especially suitable are combinations of various catalysts, especially combinations of at least one metal catalyst and at least one nitrogen compound.

Preferred catalysts are organotin compounds, organotitanates, amines, amidines, guanidines and imidazoles. Particular preference is given to organotitanates and amidines.

Further suitable constituents of such a moisture-curing composition are especially the following auxiliaries and additives:

adhesion promoters and/or crosslinkers, especially silanes such as the aminosilanes already mentioned as catalyst, aminosilanes having secondary amino groups, such as, in particular, N-phenyl-, N-cyclohexyl- and N-alkylaminosilanes, and additionally mercaptosilanes, epoxysilanes, (meth)acryloylsilanes, anhydridosilanes, carbamatosilanes, alkylsilanes and iminosilanes, and oligomeric forms of these silanes, and adducts formed from primary aminosilanes with epoxysilanes or (meth)acryloylsilanes or anhydridosilanes. Especially suitable are 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-ureidopropyltrimethoxysilane and the corresponding silanes having ethoxy groups in place of the methoxy groups, and oligomeric forms of these silanes;

plasticizers, especially carboxylic esters such as phthalates, especially dioctyl phthalate, diisononyl phthalate or diisodecyl phthalate, adipates, especially dioctyl adipate, azelates, sebacates, polyols, especially polyoxyalkylenepolyols or polyesterpolyols, glycol ethers, glycol esters, organic phosphoric and sulfonic esters, polybutenes, or fatty acid methyl or ethyl esters derived from natural fats or oils, also called "biodiesel";

solvents;

inorganic and organic fillers, especially natural, ground or precipitated calcium carbonates optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow beads;

fibers, especially glass fibers, carbon fibers, metal fibers, ceramic fibers or polymer fibers such as polyamide fibers or polyethylene fibers;

dyes;

pigments, especially titanium dioxide or iron oxides;

desiccants, especially tetraethoxysilane, vinyltrimethoxy- or vinyltriethoxysilane and organoalkoxysilanes having a functional group in the α position to the silane group, especially N-(methyldimethoxysilylmethyl)-O-methylcarbamate, (methacryloyloxymethyl)silanes, methoxymethylsilanes, orthoformic esters, and also calcium oxide or molecular sieves;

rheology modifiers, especially thickeners, especially sheet silicates such as bentonites, derivatives of castor oil, hydrogenated castor oil, polyamides, polyurethanes, urea compounds, fumed silicas, cellulose ethers and hydrophobically modified polyoxyethylenes;

stabilizers against oxidation, heat, light and UV radiation;

natural resins, fats or oils such as rosin, shellac, linseed oil, castor oil and soya oil;

nonreactive polymers such as, in particular, homo- or copolymers of unsaturated monomers, especially from the group comprising ethylene, propylene, butylene, isobutylene, isoprene, vinyl acetate and alkyl (meth)acrylates, especially polyethylenes (PE), polypropylenes (PP), polyisobutylenes, ethylene-vinyl acetate copolymers (EVA) and atactic poly-α-olefins (APAO);

flame-retardant substances, especially the aluminum hydroxide and magnesium hydroxide fillers already mentioned, and also especially organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- and tris(isopropylphenyl) phosphate of different isopropylation levels, resorcinolbis(diphenyl phosphate), bisphenol A bis(diphenyl phosphate) and ammonium polyphosphates;

surface-active substances, especially wetting agents, leveling agents, deaerators or defoamers;

biocides, especially algicides, fungicides or substances that inhibit fungal growth;

and further substances customarily used in moisture-curing compositions.

It may be advisable to chemically or physically dry certain constituents before mixing them into the moisture-curing composition.

The room temperature applicable moisture-curing composition may, as well as the polymer having end groups of the formula (I), comprise further oligo- or polymers containing silane groups.

In a preferred embodiment, it is free of organotin compounds. This may be advantageous for environmental and/or toxicological reasons.

In a preferred embodiment, it does not release any methanol in the course of curing. This may be advantageous for environmental and/or toxicological reasons.

The room temperature applicable moisture-curing composition is preferably produced and kept with exclusion of moisture. Typically, the composition is storage-stable with exclusion of moisture in a suitable package or arrangement, such as, more particularly, a drum, a pouch or a cartridge.

The room temperature applicable moisture-curing composition may take the form of a one-pack composition or of a two-pack composition.

A "one-pack" composition in the present document refers to a composition in which all the constituents of the composition are stored in a mixture in the same container and which is curable with moisture.

A "two-pack" composition in the present document refers to a composition in which the constituents of the composition are present in two different components which are stored in separate containers. Not until shortly before or during the application of the composition are the two components mixed with one another, and then the mixed composition cures, the curing proceeding or being completed only through the action of moisture.

On application of the composition to at least one solid body or article, the silane groups present and any further moisture-reactive groups present come into contact with moisture, which results in curing of the composition. The curing proceeds at different rates according to the temperature, the nature of the contact, the amount of moisture and the presence of any catalysts. In the case of curing by means of air humidity, a skin is first formed at the surface of the composition. What is called the skinning time constitutes a measure of the curing rate.

The room temperature applicable moisture-curing composition has markedly elastic properties in the cured state, especially a high strength and high extensibility, good thermal stability and good adhesion properties on various substrates. As a result, it is suitable for a multitude of uses, especially as a fiber composite, potting compound, sealant, adhesive, covering, coating or paint for construction and industrial applications, for example as an electrical insulation compound, spackling compound, joint sealant, weld or flange seam sealant, parquet adhesive, assembly adhesive, bodywork adhesive, glazing adhesive, sandwich element adhesive, floor covering, floor coating, balcony coating, roof coating, concrete protection coating, parking garage coating, and as anticorrosion paint, as seal, paint, varnish and primer.

The composition is particularly suitable as an adhesive and/or sealant, especially for joint sealing and for elastic adhesive bonds in construction and industrial applications.

For use as an adhesive or sealant, the composition preferably has a pasty consistency with properties of structural viscosity. Such a pasty sealant or adhesive is especially applied to a substrate from commercial cartridges which are operated manually or by means of compressed air, or from a drum or pail by means of a conveying pump or an extruder, optionally by means of an application robot.

It is possible to bond or seal two identical or two different substrates.

Suitable substrates are especially
- glass, glass ceramic, concrete, mortar, brick, tile, gypsum and natural rocks such as granite or marble;
- metals and alloys such as aluminum, iron, steel and nonferrous metals, and also surface-finished metals and alloys such as galvanized or chromed metals;
- leather, textiles, paper, wood, woodbase materials bonded with resins, for example phenolic, melamine or epoxy resins, resin-textile composites and further polymer composites;
- plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), and also fiber-reinforced plastics such as carbon fiber-reinforced plastics (CFP), glass fiber-reinforced plastics (GFP) and sheet molding compounds (SMC), where the plastics may preferably have been surface-treated by means of plasma, corona or flames;
- coated substrates such as powder-coated metals or alloys;
- paints and lacquers, especially automotive topcoats.

The substrates may be pretreated if required prior to the application of the adhesive or sealant, especially by physical and/or chemical cleaning methods or the application of an adhesion promoter, an adhesion promoter solution or a primer.

After the bonding or sealing of two substrates, a bonded or sealed article is obtained. Such an article may be a built structure, especially a built structure in construction or civil engineering, or it may be an industrial good or a consumer good, especially a window, a domestic appliance, or a means of transport such as, more particularly, an automobile, a bus, a truck, a rail vehicle, a ship, an aircraft or a helicopter; or the article may be an installable component thereof.

The room temperature applicable moisture-curing composition has good storage stability and processibility, crosslinks very quickly with moisture to give an elastic material of high strength and extensibility, and has particularly good thermal stability in the cured state.

A hotmelt adhesive containing silane groups especially comprises a room temperature solid polymer having end groups of the formula (I) and at least one further constituent. Suitable further constituents are especially the following auxiliaries and additives:
- further crosslinkable polymers, especially polymers having silane groups and/or having isocyanate groups;
- nonreactive thermoplastic polymers, especially homo- or copolymers of unsaturated monomers, especially from the group encompassing ethylene, propylene, butylene, isobutylene, isoprene, vinyl acetate, and alkyl (meth) acrylate, especially polyethylene (PE), polypropylene (PP), polyisobutylene, ethylene-vinyl acetate copolymers (EVA), and atactic poly-α-olefins (APAO); additionally polyesters, polyacrylates, polymethacrylates, polyacrylamides, polyacrylonitriles, polyimides, polyamides, polyvinyl chlorides, polysiloxanes, polyurethanes, polystyrenes, and combinations thereof, especially polyetheramide copolymers, styrene-butadiene-styrene copolymers, styrene-isoprene-styrene copolymers, styrene-ethylene-butylene-styrene copolymers, styrene-ethylene-propylene-styrene copolymers; and also additionally butyl rubber, polyisobutylene, and combinations thereof, and also asphalt, bitumen, crude rubber, fluorinated rubber, and cellulose resins;
- tackifier resins, especially a hydrocarbon resin such as, more particularly, coumarone-indene resins, terpene resins, phenol-modified terpene resins, natural, optionally modified resins such as, more particularly, rosin, tung resin or tall oil resin, and also α-methylstyrene resins and polymeric lactic acid;

plasticizers, especially carboxylic esters such as phthalates or adipates, polyols, organic phosphoric and sulfonic esters, or polybutenes;

catalysts for the crosslinking reactions, especially metal catalysts and/or nitrogen-containing compounds, more particularly organotin compounds, organotitanates, amines, amidines, guanidines, and imidazoles;

stabilizers to counter oxidation, heat, hydrolysis, light, and UV radiation, biocides, fungicides, and flame retardants;

drying agents, especially tetraethoxysilane, vinyltrimethoxy- or vinyltriethoxy-silane, and organoalkoxysilanes, having a functional group in the α position to the silane group, more particularly N-(methyldimethoxysilylmethyl)-O-methylcarbamate, (methacryloyloxymethyl)silanes, methoxymethylsilanes, orthoformic esters, and also calcium oxide or molecular sieves;

adhesion promoters and/or crosslinkers, especially silanes such as aminosilanes, mercaptosilanes, epoxysilanes, (meth)acryloylsilanes, anhydridosilanes, carbamatosilanes, alkylsilanes, and iminosilanes;

inorganic and organic fillers, especially mineral fillers, molecular sieves, silicas including finely divided silicas from pyrolysis processes, industrially manufactured carbon blacks, graphite, metal powders, PVC powders, or hollow beads;

dyes;

and also further substances in common use in reactive hotmelt adhesives.

It may be advisable to chemically or physically dry certain constituents before adding them.

A hotmelt adhesive containing silane groups preferably has a content of room temperature solid polyurethane polymer having end groups of the formula (I) in the range from 5% to 100% by weight, especially 15% to 95% by weight, more preferably 30% to 90% by weight, most preferably 50% to 80% by weight.

A hotmelt adhesive containing silane groups preferably comprises at least one further polymer selected from the group consisting of nonreactive thermoplastic polymers and tackifier resins.

A hotmelt adhesive containing silane groups preferably has a content of polymers including the room temperature solid polyurethane polymer containing silane groups in the range from 70% to 100% by weight, more preferably 80% to 100% by weight, especially 90% to 100% by weight.

A hotmelt adhesive containing silane groups, in a preferred embodiment, is free of organotin compounds. This may be advantageous for environmental and/or toxicological reasons.

A hotmelt adhesive containing silane groups is storage-stable with exclusion of moisture in a suitable package or arrangement.

On contact with moisture, the silane groups are hydrolyzed, which ultimately leads to crosslinking of the adhesive. If the hotmelt adhesive also contains isocyanate groups as well as the silane groups, these likewise react with moisture, which additionally contributes to crosslinking of the adhesive.

A hotmelt adhesive containing silane groups, when used in the liquid state, is applied to at least one substrate. For this purpose, the adhesive is heated beforehand at least to such an extent that it is in liquid form. The adhesive is typically applied at a temperature in the range from 80 to 200° C., especially 100 to 180° C.

During the processing, the uncrosslinked adhesive has good thermal stability. This is shown by the fact that the adhesive can be left in the hot liquid state over a period sufficient for proper application, especially for up to several hours, without any excessive rise in its viscosity, especially without any gelation, and without occurrence of odor immissions.

The adhesive applied is advantageously joined to a second substrate to give a bond before it has solidified excessively as a result of cooling.

The solidification of the adhesive as a result of cooling brings about a very rapid buildup of strength and a high initial strength of the bond. In addition to this physical curing of the adhesive, even after the solidification, crosslinking occurs in the adhesive via silane groups and any isocyanate groups as a result of moisture, as described above. This chemical crosslinking ultimately leads to a cured crosslinked adhesive which cannot be melted again by reheating to the application temperature.

Suitable substrates which can be bonded with a hotmelt adhesive containing silane groups are especially the substrates already mentioned. Preferred substrates are plastics, textiles, leather, wood, woodbase materials, polymer composites, paper, metals, paints and lacquers.

The substrates may have been pretreated prior to the application of the adhesive, for example by a physical and/or chemical cleaning operation or by the application of an adhesion promoter, an adhesion promoter solution or a primer.

It is possible to bond two identical substrates or two different substrates. The adhesive is either applied to one of the two substrates and joined to the other to give a bond, or it can be applied to both substrates to be bonded. Preference is given to the bonding of two different substrates.

The hotmelt adhesive containing silane groups can especially be used for construction and industrial applications, especially as laminating adhesive, laminate adhesive, packaging adhesive, textile adhesive or wood adhesive. It is particularly suitable for bonds in which the bonding site is visible, especially for the bonding of glass, for example in motor vehicle and window construction, and for the bonding of transparent packaging.

The use of a hotmelt adhesive containing silane groups results in an article. Preferred articles are automobile interior trim parts such as, more particularly, roof linings, sunscreens, dashboards, door side parts, rear shelves and the like, wood fiber materials from the shower and bathroom sector, decorative furniture films, membrane films comprising textiles such as, more particularly, cotton, polyester films in the apparel sector, composites made from textiles and foams for automotive finishing, and transparent packaging.

A hotmelt adhesive containing silane groups comprising a room temperature solid polymer having end groups of the formula (I) has a number of advantages. It allows a low hazard classification since—according to the stoichiometry used—it has a low or zero content of monomeric isocyanates. It is storage-stable in suitable packaging. When heated to a temperature in the range from 80 to 200° C., especially 100 to 180° C., it has a viscosity at which it has good applicability, and has good stability in the hot liquid state. The adhesive crosslinks even at room temperature under the influence of moisture, does not form any bubbles in the process and leads to a visually and mechanically highquality adhesive bond with excellent adhesion and good stability with respect to environmental influences.

EXAMPLES

Detailed hereinafter are working examples which are intended to illustrate the invention described in detail. It will be appreciated that the invention is not restricted to these described working examples.

"Standard climatic conditions" are understood to mean a temperature of 23±1° C. and a relative air humidity of 50±5%. "SCC" stands for standard climatic conditions.

$^1$H NMR spectra were measured in CDCl$_3$ on a Bruker Ascend 400 spectrometer at 400.14 MHz; the chemical shifts δ are reported in ppm relative to tetramethylsilane (TMS); the coupling constants J are reported in Hz.

Infrared spectra (FT-IR) were measured as undiluted films on a Nicolet iS5 FT-IR system, equipped with a horizontal ATR measurement unit with a diamond crystal, from Thermo Scientific; the absorption bands are reported in wavenumbers (cm$^{-1}$) (measurement window: 4000-650 cm$^{-1}$). The addition "sh" indicates a band that appears as a shoulder.

Gas chromatograms (GC) were measured in the temperature range from 60 to 320° C. with a heating rate of 30° C./min and a dwell time of 15 min at 320° C. The injector temperature was 200° C. Detection was effected by means of flame ionization (FID), with evaluation of the signals via the area percent method.

Viscosities at 20° C. were measured on a thermostatted Rheotec RC30 cone-plate viscometer (cone diameter 50 mm, cone angle 1°, cone tip-plate distance 0.05 mm, shear rate 10 s$^{-1}$).

Viscosities at 160° C. were measured on a thermostatted Rheotec RC30 plate-plate viscometer (plate diameter 25 mm, distance 1 mm, shear rate 10 s$^{-1}$).

1. Preparation of Hydroxysilanes

Hydroxysilane HS-1a:
N-(3-triethoxysilylpropyl)-2-hydroxypropanamide

In a round-bottom flask, 36.00 g (162.6 mmol) of 3-aminopropyltriethoxysilane, 12.07 g (83.7 mmol) of L-lactide and 0.15 g of vinyltriethoxysilane were stirred under a nitrogen atmosphere at 80° C. for 3 h, until the reaction was found to have progressed no further by means of IR spectroscopy. The crude product was aftertreated at 60° C. and about 10 mbar for 15 minutes. A liquid product having a theoretical OH equivalent weight of 293.4 g/eq was obtained.

FT-IR: 3406 sh (O—H), 3322 (N—H amide), 2974, 2928, 2885, 2736, 1741 (C═O ester), 1651 (C═O amide), 1535 (C═O amide), 1482, 1444, 1411, 1390, 1365, 1279, 1192, 1165, 1100, 1073, 996, 954, 886, 863, 775, 678.

$^1$H NMR: δ 6.69 (s, 1 H, O═C—NH), 4.21 (q, 1 H, (R)$_3$CH, J=6.8), 3.82 (q, 6 H, Si—O—CH$_2$—CH$_3$, J=7.0), 3.28 (m, 2 H, NH—CH$_2$—CH$_2$—CH$_2$—Si), 1.65 (m, 2 H, NH—CH$_2$—CH$_2$—CH$_2$—Si), 1.42 (d, 3 H, CH$_3$—CH(R)$_2$, J=6.8), 1.23 (t, 9 H, Si—O—CH$_2$—CH$_3$, J=7.0), 0.65 (t, 2 H, NH—CH$_2$—CH$_2$—CH$_2$—Si, J=8.1).

GC (3 days after preparation): 96.2% N-(3-triethoxysilylpropyl)-2-hydroxypropanamide, 1.7% 3-aminopropyltriethoxysilane and 2.1% ethyl lactate.

GC (6 weeks after preparation): 95.8% N-(3-triethoxysilylpropyl)-2-hydroxypropanamide, 1.3% 3-aminopropyltriethoxysilane and 2.9% ethyl lactate.

Hydroxysilane HS-1b:
N-(3-triethoxysilylpropyl)-2-hydroxypropanamide

In a round-bottom flask, 14.01 g (118.6 mmol) of ethyl-lactate, 10.00 g of ethanol and 0.15 g of vinyltriethoxysilane were stirred under a nitrogen atmosphere at 60° C. for 10 minutes. Then 25.00 g (112.9 mmol) of 3-amino-propyltriethoxysilane and 0.20 g of Tytan® TAA (titanium acetylacetonate; from Borica Company Ltd) were added and the mixture was stirred at reflux at 100° C. for 5 h, until the reaction was found to have progressed no further by means of IR spectroscopy. The crude product was aftertreated at 80° C. and about 10 mbar for 30 minutes. A liquid product having a theoretical OH equivalent weight of 293.4 g/eq was obtained.

GC (3 days after preparation): 80.4% N-(3-triethoxysilylpropyl)-2-hydroxypropanamide, 19.6% 3-aminopropyltriethoxysilane and <0.1% ethyl lactate.

Hydroxysilane HS-2a:
N-(3-trimethoxysilylpropyl)-2-hydroxypropanamide

In a round-bottom flask, 16.21 g (90.4 mmol) of 3-aminopropyltrimethoxysilane, 6.20 g (43.05 mmol) of L-lactide and 0.10 g of vinyltrimethoxysilane were stirred under a nitrogen atmosphere at 60° C. for a few minutes, until all the solids were in solution. The mixture was then left to stand under nitrogen at 23° C. for 48 h. According to IR spectroscopy, the reaction was complete. A liquid product having a theoretical OH equivalent weight of 251.4 g/eq was obtained.

FT-IR: 3410 sh (O—H), 3349 (N—H amide), 2969, 2940, 2841, 1746 (C═O ester), 1651 (C═O amide), 1532 (C═O amide), 1446, 1412, 1367, 1347, 1311, 1279, 1191, 1080, 1038, 963, 884, 864, 808, 776 sh, 677.

Hydroxysilane HS-2b:
N-(3-trimethoxysilylpropyl)-2-hydroxypropanamide

In a round-bottom flask, 12.34 g (118.6 mmol) of methyl L-lactate, 10.00 g of methanol and 0.15 g of vinyltrimethoxysilane were stirred under a nitrogen atmosphere at 60° C. for 10 minutes. Then 20.25 g (112.9 mmol) of 3-aminopropyltrimethoxysilane and 0.20 g of Tytan® TAA were added and the mixture was stirred at reflux at 90° C. for 6 h, until the reaction was found to have progressed no further by means of IR spectroscopy. The crude product was aftertreated at 60° C. and about 30 mbar for 30 minutes. A liquid product having a theoretical OH equivalent weight of 251.4 g/eq was obtained.

Hydroxysilane HS-3:
N-(3-triethoxysilylpropyl)-2-hydroxyacetamide

In a round-bottom flask, 21.29 g (96.2 mmol) of 3-aminopropyltriethoxysilane, 5.47 g (47.1 mmol) of 1,4-dioxane-2,5-dione and 0.10 g of vinyltriethoxysilane were stirred under a nitrogen atmosphere at 100° C. for 2 h, until the reaction was found to have progressed no further by means of IR spectroscopy. The crude product was aftertreated at 40° C. and about 30 mbar for 10 minutes. A liquid product having a theoretical OH equivalent weight of 279.4 g/eq was obtained.

FT-IR: 3418 sh (O—H), 3326 (N—H amide), 2973, 2927, 2885, 2735, 1756 (C═O ester), 1655 (C═O amide), 1536

(C=O amide), 1482, 1443, 1411, 1390, 1366, 1350, 1293, 1192, 1165, 1100, 1072, 953, 880, 849, 772, 680.

Hydroxysilane HS-4:
N-(3-trimethoxysilylpropyl)-2-hydroxyacetamide

In a round-bottom flask, 16.21 g (90.4 mmol) of 3-aminopropyltrimethoxysilane, 5.14 g (44.3 mmol) of 1,4-dioxane-2,5-dione and 0.10 g of vinyltrimethoxy-silane were stirred at 100° C. under a nitrogen atmosphere for 2 h, until the reaction was found to have progressed no further by means of IR spectroscopy. The crude product was aftertreated at 40° C. and about 50 mbar for 10 minutes. A liquid product having a theoretical OH equivalent weight of 237.3 g/eq was obtained.

FT-IR: 3414 sh (O—H), 3308 (N—H amide), 2941, 2841, 1757 (C=O ester), 1652 (C=O amide), 1533 (C=O amide), 1444, 1412, 1350, 1281, 1191, 1076, 892, 808, 771, 679.

Hydroxysilane HS-5: N-(3-triethoxysilylpropyl)-2-hydroxy-2-methylpropanamide

In a round-bottom flask, 15.67 g (118.6 mmol) of ethyl 2-hydroxyisobutyrate and 0.15 g of vinyltriethoxysilane were stirred under a nitrogen atmosphere at and 60° C. for 10 minutes. Then 25.00 g (112.9 mmol) of 3-aminopropyltriethoxysilane and 0.20 g of Tytan® TAA were added and the mixture was stirred at 130° C. for 6 h, until the reaction was found to have progressed no further by means of IR spectroscopy. The crude product was aftertreated at 80° C. and about 10 mbar for 30 minutes. A liquid product having a theoretical OH equivalent weight of 307.5 g/eq was obtained.

FT-IR: 3414 sh (O—H), 3349 (N—H amide), 2973, 2926, 2881, 2735 sh, 1727 (C=O ester), 1649 (C=O amide), 1605 sh, 1533 (C=O amide), 1465, 1446, 1390, 1359, 1344, 1280, 1240, 1163, 1101, 1077, 993, 953, 842, 777, 679.

Hydroxysilane HS-6: N-(3-trimethoxysilylpropyl)-2-hydroxy-2-methylpropanamide

In a round-bottom flask, 14.00 g (118.6 mmol) of methyl 2-hydroxyisobutyrate and 0.15 g of vinyltrimethoxysilane were stirred under a nitrogen atmosphere at 60° C. for 10 minutes. Then 20.25 g (112.9 mmol) of 3-aminopropyltrimethoxysilane and 0.20 g of Tytan® TAA were added and the mixture was stirred at 110° C. for 5 h, until the reaction was found to have progressed no further by means of IR spectroscopy. The crude product was aftertreated at 60° C. and about 30 mbar for 30 minutes. A liquid product having a theoretical OH equivalent weight of 265.4 g/eq was obtained.

FT-IR: 3410 sh (O—H), 3353 (N—H amide), 2969, 2940, 2840, 1746 (C=O ester), 1650 (C=O amide), 1609 sh, 1531 (C=O amide), 1464, 1411, 1368, 1280, 1188, 1078, 1019, 969, 936, 909, 854, 804, 678.

2. Preparation of Polyurethane Polymers Having Isocyanate Groups

Polymer NCO-1:
With exclusion of moisture, 1000 g of Acclaim® 12200 polyol (polyoxypropylenediol having a low unsaturation level, from Bayer; OH number 11.0 mg KOH/g), 43.6 g of isophorone diisocyanate (Vestanat® IPDI, from Evonik), 126.4 g of diisodecyl phthalate (DIDP) and 0.1 g of bismuth tris(neodecanoate) (10% by weight in DIDP) were heated at 90° C. while stirring constantly and left at this temperature until the content of free isocyanate groups, determined by titrimetry, had reached a stable value of 0.63% by weight. The product was cooled to room temperature and stored with exclusion of moisture. The day after the preparation, it had a viscosity at 20° C. of 31 Pa·s.

Polymer NCO-2:
With exclusion of moisture, 1000 g of Acclaim® 12200 polyol (polyoxypropylenediol having a low unsaturation level, from Bayer; OH number 11.0 mg KOH/g), 34.2 g of tolylene 2,4-diisocyanate (Desmodur® T-100, from Bayer), 126.4 g of diisodecyl phthalate (DIDP) and 0.1 g of bismuth tris(neodecanoate) (10% by weight in DIDP) were heated at 90° C. while stirring constantly and left at this temperature until the content of free isocyanate groups, determined by titrimetry, had reached a stable value of 0.65% by weight. The product was cooled to room temperature and stored with exclusion of moisture. The day after the preparation, it had a viscosity at 20° C. of 35 Pa·s.

Polymer NCO-3:
A mixture of 1,200.0 g of room temperature solid, amorphous polyesterdiol (Dynacoll® 7150, from Evonik; OH number 43 mg KOH/g) and 1,200.0 g of polyesterdiol (Dynacoll® 7250, from Evonik; OH number 22 mg KOH/g) was dried at 120° C. under reduced pressure for 2 h and degassed, then 348.4 g of diphenylmethane 4,4'-diisocyanate (Desmodur® 44 MC L, from Bayer) were added, and the mixture was stirred at 130° C. under reduced pressure for 2 h and then cooled and stored with exclusion of moisture. The polyurethane polymer obtained was solid at room temperature and had a content of free isocyanate groups, determined by titrimetry, of 2.15% by weight.

3. Preparation of Isocyanatosilanes
Isocyanatosilane IS-1:
In a round-bottom flask, 8.00 g (27.3 mmol) of hydroxysilane HS-1a, 6.06 g (27.3 mmol) of isophorone diisocyanate (Vestanat® IPDI, from Evonik) and 0.03 g of bismuth tris(neodecanoate) (10% by weight in DIDP) were stirred under a nitrogen atmosphere at 80° C. for 4 h and then stored with exclusion of moisture at room temperature for 4 days. A highly viscous product having a content of free isocyanate groups, determined by titrimetry, of 8.2% by weight was obtained.

FT-IR: 3436 sh, 3312 (N—H amide), 3090, 2973, 2927, 2894, 2254 (N=C=O), 1704 (C=O urethane), 1661 (C=O amide), 1532 (C=O amide), 1462, 1445, 1411, 1388, 1365, 1303, 1237, 1194, 1164, 1102, 1075, 955, 904, 857, 773.

Isocyanatosilane IS-2:
In a round-bottom flask, 8.00 g (27.3 mmol) of hydroxysilane HS-1a, 4.74 g (27.3 mmol) of tolylene 2,4-diisocyanate (Desmodur® T-100, from Bayer) were stirred under a nitrogen atmosphere at 80° C. for 4 h and then stored with exclusion of moisture at room temperature for 4 days. A very highly viscous product having a content of free isocyanate groups, determined by titrimetry, of 6.5% by weight was obtained.

FT-IR: 3427 sh, 3295 (N—H amide), 3099, 2974, 2927, 2885, 2267 (N=C=O), 1732 (C=O urethane), 1658 (C=O amide), 1617, 1596, 1537 (C=O amide), 1445, 1413, 1387, 1367, 1306, 1276, 1221, 1165, 1099, 1074, 995, 953, 874, 767, 703, 677.

4. Preparation of Polymers Having End Groups of the Formula (I)

Polymers SP-1 to SP-8 (Liquid at Room Temperature)
For each polymer, 100 parts by weight of polymer NCO-1 were mixed with the hydroxysilane specified in table 1 in the amount specified (OH/NCO=1.10). The mixture was stirred under a nitrogen atmosphere at 70° C. until no isocyanate groups were detectable any longer by means of IR spectroscopy (about 2 hours). Subsequently, the reaction mixture was cooled and stored with exclusion of moisture. The viscosity in each case was measured the day after the preparation at a temperature of 20° C. The properties of the polymers obtained are reported in table 1.

TABLE 1

Composition and properties of the polymers containing silane groups SP-1 to SP-8.

| Polymer | SP-1 | SP-2 | SP-3 | SP-4 | SP-5 | SP-6 | SP-7 | SP-8 |
|---|---|---|---|---|---|---|---|---|
| Polymer NCO-1 | 100.00 | 100.00 | 100.00 | 100.00 | 100.00 | 100.00 | 100.00 | 100.00 |
| Hydroxysilane | HS-1a, 4.84 | HS-1b, 4.84 | HS-3, 4.61 | HS-5, 5.07 | HS-2a, 4.15 | HS-2b, 4.15 | HS-4, 3.92 | HS-6, 4.38 |
| Viscosity [Pa · s] | 63 | 125 | 120 | 85 | 128 | 179 | 114 | 295 |

Polymer SP-9: (Liquid at Room Temperature)

100.00 g of polymer NCO-2 were mixed with 4.99 g of hydroxysilane HS-1a. This mixture was stirred under a nitrogen atmosphere at 60° C. until no isocyanate groups were detectable any longer by means of IR spectroscopy (about 2 hours). Subsequently, the reaction mixture was cooled and stored with exclusion of moisture.

The day after the preparation, the viscosity was 106 Pa·s at 20° C.

Polymer SP-10: (Liquid at Room Temperature)

To a predried mixture of 100.0 g (20 mmol OH) Acclaim® 12200 polyol (polyoxypropylenediol having a low unsaturation level, from Bayer; OH number 11.0 mg KOH/g) and 12.25 g of diisodecyl phthalate were added 10.83 g of isocyanatosilane IS-1 and 0.15 g of bismuth tris(neodecanoate) (10% by weight in DIDP). This mixture was stirred under a nitrogen atmosphere at 80° C. until no further change in the isocyanate band was detectable by means of IR spectroscopy (about 2 hours). Then 0.30 g of anhydrous ethanol was added, and the mixture was stirred at 70° C. for 5 minutes and degassed at 80° C. under reduced pressure for 15 minutes. Thereafter, no isocyanate groups were detectable any longer by means of IR spectroscopy.

The day after the preparation, the viscosity was 128 Pa·s at 20° C.

Polymer SP-11: (Liquid at Room Temperature)

Polymer SP-11 was prepared like polymer SP-10, except that, rather than the isocyanatosilane IS-1, 9.82 g of isocyanatosilane IS-2 were used.

The day after the preparation, the viscosity was 46 Pa·s at 20° C.

Polymer SP-12 (Solid at Room Temperature)

To 100.0 g of the molten polymer NCO-3 were added 17.28 g of hydroxysilane HS-1a. This mixture was stirred under a nitrogen atmosphere at 120° C. until no isocyanate groups were detectable any longer by means of IR spectroscopy (about 2 hours). Subsequently, the reaction mixture was cooled and stored with exclusion of moisture.

The day after the preparation, the viscosity was 35 Pa·s at 160° C.

5. Production of Room Temperature Applicable Moisture-Curing Compositions

Compositions Z-1 to Z-12

For each composition, the ingredients specified in table 2 or 3 in the amounts specified (in parts by weight) were processed in a vacuum mixer at 50° C. with exclusion of moisture for 30 minutes to give a homogeneous paste and stored. Each composition was tested as follows:

To determine the skinning time, a few grams of the composition were applied to cardboard in a layer thickness of about 2 mm and, under standard climatic conditions, the time until, when the surface of the composition was tapped gently by means of an LDPE pipette, there were for the first time no remaining residues on the pipette was determined.

To determine the mechanical properties, the composition was cast on a PTFE-coated film to give a film of thickness 2 mm, which was stored under standard climatic conditions for 2 weeks, some dumbbells having a length of 75 mm with a bar length of 30 mm and a bar width of 4 mm were punched out of the film and these were tested in accordance with DIN EN 53504 at a pulling speed of 200 mm/min for tensile strength (breaking force), elongation at break and modulus of elasticity (modulus of elasticity at 0.5%-50% elongation).

Shore A hardness was determined in accordance with DIN 53505 on test specimens which had been cured under standard climatic conditions for 14 days.

These results are appended with "SCC:".

As a measure of thermal stability, some dumbbells and the Shore A test specimen after the 2 weeks under standard climatic conditions were additionally stored in an air circulation oven at 100° C. for four weeks and then tested in the same way for tensile strength, elongation at break and modulus of elasticity, or for Shore A hardness. These results are appended with "100° C.:". The results are reported in tables 2 and 3.

The thixotropic paste was produced by initially charging a vacuum mixer with 300 g of diisodecyl phthalate and 48 g of diphenylmethane 4,4'-diisocyanate (Desmodur® 44 MC L; from Bayer), gently heating and then slowly adding dropwise 27 g of monobutylamine while stirring vigorously. Stirring of the resultant paste continued under reduced pressure and with cooling for one hour.

TABLE 2

Composition and properties of compositions Z-1 to Z-5.

| Composition | Z-1 | Z-2 | Z-3 | Z-4 | Z-5 |
|---|---|---|---|---|---|
| Polymer | SP-1, 15.00 | SP-2, 15.00 | SP-3, 15.00 | SP-4, 15.00 | SP-5, 15.00 |
| Diisodecyl phthalate | 20.00 | 20.00 | 20.00 | 20.00 | 20.00 |
| Thixotropic paste | 2.00 | 2.00 | 2.00 | 2.00 | 2.00 |
| Vinyltriethoxysilane | 1.00 | 1.00 | 1.00 | 1.00 | — |
| Vinyltrimethoxysilane | — | — | — | — | 1.00 |
| Socal® U1 S2 [1] | 10.00 | 10.00 | 10.00 | 10.00 | 10.00 |
| Omyacarb® 5 GU [2] | 50.00 | 50.00 | 50.00 | 50.00 | 50.00 |
| Tyzor® IBAY [3] | 1.25 | 1.25 | 1.25 | 1.25 | 1.25 |
| Skinning time [min] | 55 | 35 | 30 | 60 | 15 |
| SCC: Shore A | 38 | 32 | 29 | 27 | 32 |
| Tensile strength [MPa] | 1.50 | 1.02 | 0.96 | 0.90 | 1.03 |
| Elongation at break [%] | 150 | 135 | 110 | 125 | 125 |
| Modulus of elasticity [MPa] | 1.19 | 0.81 | 0.83 | 0.74 | 0.83 |
| 100° C.: Shore A | 28 | 17 | 14 | 17 | 18 |

TABLE 2-continued

Composition and properties of compositions Z-1 to Z-5.

| Composition | Z-1 | Z-2 | Z-3 | Z-4 | Z-5 |
|---|---|---|---|---|---|
| Tensile strength [MPa] | 0.94 | 0.63 | 0.51 | 0.54 | 0.61 |
| Elongation at break [%] | 125 | 105 | 100 | 135 | 110 |
| Modulus of elasticity [MPa] | 0.77 | 0.59 | 0.50 | 0.45 | 0.55 |

[1] precipitated calcium carbonate (from Solvay)
[2] ground calcium carbonate (from Omya)
[3] bis(ethylacetoacetato)diisobutoxytitanium(IV) (from Dorf Ketal)

TABLE 3

Composition and properties of compositions Z-6 to Z-11.

| Composition | Z-6 | Z-7 | Z-8 | Z-9 | Z-10 | Z-11 |
|---|---|---|---|---|---|---|
| Polymer | SP-6 15.00 | SP-7 15.00 | SP-8 15.00 | SP-9, 15.00 | SP-10, 15.00 | SP-11, 15.00 |
| Diisodecyl phthalate | 20.00 | 20.00 | 20.00 | 20.00 | 20.00 | 20.00 |
| Thixotropic paste | 2.00 | 2.00 | 2.00 | 2.00 | 2.00 | 2.00 |
| Vinyltriethoxysilane | — | — | — | 1.00 | 1.00 | 1.00 |
| Vinyltrimethoxysilane | 1.00 | 1.00 | 1.00 | — | — | — |
| Socal ® U1 S2 [1] | 10.00 | 10.00 | 10.00 | 10.00 | 10.00 | 10.00 |
| Omyacarb ® 5 GU [2] | 50.00 | 50.00 | 50.00 | 50.00 | 50.00 | 50.00 |
| Tyzor ® IBAY [3] | 1.25 | 1.25 | 1.25 | 1.25 | 1.25 | 1.25 |
| Skinning time [min] | 30 | 20 | 5 | 40 | 85 | 85 |
| SCC: Shore A | 15 | 16 | 19 | 39 | 25 | 21 |
| Tensile strength [MPa] | 0.45 | 0.42 | 0.55 | 1.37 | 0.85 | 0.62 |
| Elongation at break [%] | 85 | 65 | 95 | 145 | 120 | 83 |
| Modulus of elasticity [MPa] | 0.48 | 0.53 | 0.57 | 1.12 | 0.66 | 0.64 |

[1] precipitated calcium carbonate (from Solvay)
[2] ground calcium carbonate (from Omya)
[3] bis(ethylacetoacetato)diisobutoxytitanium(IV) (from Dorf Ketal)

6. Production of Hotmelt Adhesives

Hotmelt Adhesive K-1:

To 100.00 g of polymer SP-12 melted at 140° C. was added 0.02 g of dibutyltin dilaurate. The resultant hotmelt adhesive was stored with exclusion of moisture.

To determine the mechanical properties, the hotmelt adhesive was pressed in a heatable press between two PTFE-coated films to give a film of thickness 1 mm and cooled down, the PTFE-coated films were removed and the film was stored under SCC for 10 days. Thereafter, dumbbell-shaped test specimens having a length of 75 mm with a bar length of 30 mm and a bar width of 4 mm were punched out of the film and used to determine the tensile strength (breaking force), elongation at break and modulus of elasticity (within the extension range specified) in accordance with DIN EN 53504 at a pulling speed of 200 mm/min. The results are reported in table 4.

TABLE 4

Mechanical properties of hotmelt adhesive K-1.

| | Hotmelt adhesive K-1 |
|---|---|
| Tensile strength [MPa] | 0.20 |
| Elongation at break [%] | 500 |
| Modulus of elasticity (0.5-5%) [MPa] | 1.22 |
| Modulus of elasticity (0.5-25%) [MPa] | 0.39 |
| Modulus of elasticity (0.5-50%) [MPa] | 0.16 |
| Appearance | clear, bubble-free |

The invention claimed is:

1. A polymer having end groups of the formula (I)

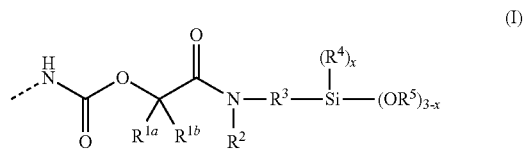

where $R^{1a}$ is a methyl radical;

$R^{1b}$ is a hydrogen atom;

$R^2$ is a hydrogen atom or a monovalent hydrocarbyl radical which has 1 to 12 carbon atoms and optionally contains ether groups, ester groups, nitrile groups, amino groups or silane groups;

$R^3$ is a linear or branched alkylene or cycloalkylene radical having 1 to 20 carbon atoms, optionally having aromatic moieties, and optionally having one or more heteroatoms;

$R^4$ is an alkyl radical having 1 to 8 carbon atoms;

$R^5$ is an alkyl radical which has 1 to 10 carbon atoms and optionally contains ether groups; and x is 0, 1 or 2.

2. The polymer as claimed in claim 1, wherein $R^2$ is a hydrogen atom or an alkyl radical or a cycloalkyl radical or an alkoxysilyl-alkyl radical.

3. The polymer as claimed in claim 1, wherein $R^3$ is selected from the group consisting of 1,3-propylene, 2-methyl-1,3-propylene, 1,4-butylene, 3-methyl-1,4-butylene and 3,3-dimethyl-1,4-butylene.

4. The polymer as claimed in claim 1, wherein $R^5$ is a methyl radical or ethyl radical.

5. The polymer as claimed in claim 1, wherein x is 1 or 0.

6. The polymer as claimed in claim 1, which has a functionality, based on the end groups of the formula (I), in the range from 1 to 4.

7. The polymer as claimed in claim 1, which has an average molecular weight in the range from 1,000 to 30,000 g/mol.

8. The polymer as claimed in claim 1, which is liquid at room temperature and has a majority of polyoxyalkylene units.

9. The polymer as claimed in claim 1, which is solid at room temperature and has a majority of polyester units and/or polycarbonate units.

10. A process for preparing the polymer as claimed in claim 1, comprising reacting:

at least one polyol, at least one diisocyanate, either at least one lactide of the formula (II) or at least one hydroxy ester of the formula (III), and at least one aminosilane of the formula (IV) with one another,

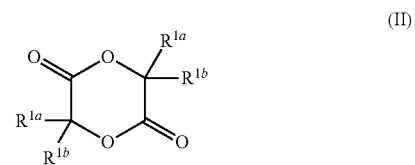

-continued

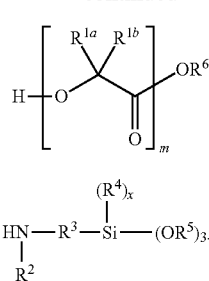  (III)

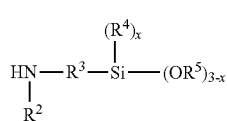  (IV)

where m is an integer from 1 to 100; and $R^6$ is a monovalent hydrocarbyl radical having 1 to 12 carbon atoms.

11. The process as claimed in claim 10, wherein a hydroxy-silane of the formula (V) is obtained as an intermediate

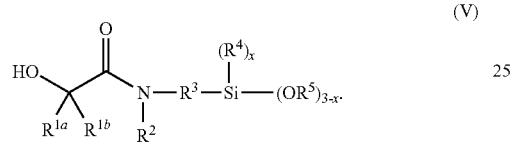  (V)

12. The process as claimed in claim 11, wherein the hydroxysilane of the formula (V) is prepared using a lactide of the formula (II).

13. A curable composition comprising the polymer as claimed in claim 1 and at least one further constituent.

14. The curable composition as claimed in claim 13, wherein the curable composition is either a moisture-curing composition applicable at room temperature or a hotmelt adhesive containing silane groups.

15. A process for preparing a polymer having end groups of the formula (I)

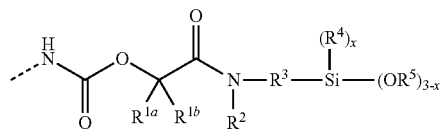  (I)

where $R^{1a}$ and $R^{1b}$ are each independently a hydrogen atom or a monovalent hydrocarbyl radical having 1 to 12 carbon atoms, or together are an alkylene radical having 2 to 6 carbon atoms;

$R^2$ is a hydrogen atom or a monovalent hydrocarbyl radical which has 1 to 12 carbon atoms and optionally contains ether groups, ester groups, nitrile groups, amino groups or silane groups;

$R^3$ is a linear or branched alkylene or cycloalkylene radical having 1 to 20 carbon atoms, optionally having aromatic moieties, and optionally having one or more heteroatoms;

$R^4$ is an alkyl radical having 1 to 8 carbon atoms;

$R^5$ is an alkyl radical which has 1 to 10 carbon atoms and optionally contains ether groups; and x is 0, 1 or 2, the method comprising reacting:

at least one polyol, at least one diisocyanate, either at least one lactide of the formula (II) or at least one hydroxy ester of the formula (III), and at least one aminosilane of the formula (IV) with one another,

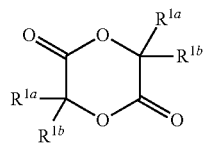  (II)

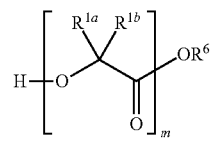  (III)

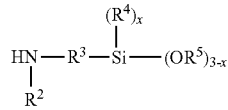  (IV)

where m is an integer from 1 to 100; and $R^6$ is a monovalent hydrocarbyl radical having 1 to 12 carbon atoms.

16. The process as claimed in claim 15, wherein a hydroxy-silane of the formula (V) is obtained as an intermediate

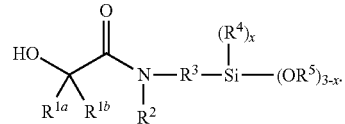  (V)

* * * * *